United States Patent
Aso

(10) Patent No.: US 9,483,396 B2
(45) Date of Patent: Nov. 1, 2016

(54) CONTROL APPARATUS, STORAGE DEVICE, AND STORAGE CONTROL METHOD

(71) Applicant: Sony Corporation, Tokyo (JP)

(72) Inventor: Shingo Aso, Tokyo (JP)

(73) Assignee: Sony Corporation, Tokyo (JP)

( * ) Notice: Subject to any disclaimer, the term of this patent is extended or adjusted under 35 U.S.C. 154(b) by 212 days.

(21) Appl. No.: 13/888,038

(22) Filed: May 6, 2013

(65) Prior Publication Data

US 2013/0311712 A1    Nov. 21, 2013

(30) Foreign Application Priority Data

May 17, 2012  (JP) ................ 2012-113031

(51) Int. Cl.
*G06F 12/00* (2006.01)
*G06F 12/02* (2006.01)
*G06F 12/04* (2006.01)

(52) U.S. Cl.
CPC ........... *G06F 12/0246* (2013.01); *G06F 12/04* (2013.01); *G06F 2212/7203* (2013.01)

(58) Field of Classification Search
CPC .................................................. G06F 12/0246
USPC ........................................................ 711/103
See application file for complete search history.

(56) References Cited

U.S. PATENT DOCUMENTS

| | | | |
|---|---|---|---|
| 2007/0192530 A1* | 8/2007 | Pedersen et al. | 711/103 |
| 2008/0183949 A1* | 7/2008 | Ly et al. | 711/103 |
| 2008/0250195 A1* | 10/2008 | Chow et al. | 711/103 |
| 2012/0089765 A1* | 4/2012 | Huang et al. | 711/103 |
| 2012/0246383 A1* | 9/2012 | Asano et al. | 711/102 |
| 2013/0007381 A1* | 1/2013 | Palmer | 711/154 |
| 2013/0031301 A1* | 1/2013 | Barndt | 711/103 |
| 2013/0073784 A1* | 3/2013 | Ng et al. | 711/103 |
| 2013/0227198 A1* | 8/2013 | Lee | 711/103 |

FOREIGN PATENT DOCUMENTS

| | | |
|---|---|---|
| JP | 2007-058840 | 3/2007 |
| JP | 2007-193838 | 8/2007 |
| JP | 2007-334852 | 12/2007 |
| JP | 2009-070098 | 4/2009 |

* cited by examiner

*Primary Examiner* — Ryan Bertram
*Assistant Examiner* — Edmund Kwong
(74) *Attorney, Agent, or Firm* — Chip Law Group

(57) ABSTRACT

A control apparatus includes a control unit configured to perform control in such a manner that in a case where data is to be written into a physical area, which is the unit in which an erasing operation is performed, subjected to processing in a first non-volatile memory in response to a write request and in a case where the end of the data does not match a boundary between physical regions, which are the smallest units in which a writing operation is performed, in the first non-volatile memory, first data having a size smaller than the smallest units is stored in a predetermined temporary storage area, and thereafter in a case where second data specified by the same logical address as the first data is requested to be written, the first data and the second data are combined and written into the physical area subjected to processing.

9 Claims, 9 Drawing Sheets

FIG. 6

| LOGICAL ADDRESS | PHYSICAL PAGE NUMBER |
|---|---|
| LOGICAL ADDRESS | PHYSICAL PAGE NUMBER |
| LOGICAL ADDRESS | PHYSICAL PAGE NUMBER |
| ⋮ | ⋮ |
| LOGICAL ADDRESS | PHYSICAL PAGE NUMBER |
| LOGICAL ADDRESS | PHYSICAL PAGE NUMBER |

CONTROL APPARATUS, STORAGE DEVICE, AND STORAGE CONTROL METHOD

CROSS REFERENCES TO RELATED APPLICATIONS

The present application claims priority to Japanese Priority Patent Application JP 2012-113031 filed in the Japan Patent Office on May 17, 2012, the entire content of which is hereby incorporated by reference.

BACKGROUND

The present disclosure relates to a control apparatus, a storage device and a storage control method for a non-volatile memory, and more particularly to processing performed in the case where the end of data, which is requested to be written, does not match a boundary between physical regions, which are the smallest units in which a writing operation is performed, of the non-volatile memory.

Storage devices using a non-volatile memory such as a NAND type flash memory are becoming widely used. A non-volatile memory is used in memory cards, solid-state drives (SSDs), embedded MultiMediaCards (eMMCs), and the like used in, for example, various types of electronic equipment and information processing apparatuses.

A storage device using a flash memory is disclosed in Japanese Unexamined Patent Application Publication Nos. 2009-70098, 2007-334852, 2007-193838, and 2007-58840.

Physical addresses are used as addresses in a physical storage area in a non-volatile memory. Physical blocks, physical pages, and physical sectors are set by using the physical addresses. A plurality of physical sectors constitute a physical page, and a plurality of physical pages constitute a physical block.

An erasing operation (Erase) is performed per physical block, and a writing operation (Program) and a reading operation (Read) may be performed per physical page.

A host apparatus uses logical addresses to specify addresses. Logical blocks and logical pages having the logical addresses are related to the physical addresses described above. As a result, in the case where accessing of an actual flash memory is requested, a logical address is converted into a physical address and the actual flash memory is accessed by using the physical address.

Here, data requested to be written into the storage device, by the host apparatus, does not have an end that matches a boundary between physical pages (which are the smallest units in which a writing operation is performed) of the non-volatile memory on every occasion.

In the case where the end of the data requested to be written does not match the boundary between the physical pages, the last portion of the data is data having a size smaller than that of a physical page (such data being hereinafter referred to as under-page-size data). Since the smallest units in which a writing operation is performed are physical pages as described above, in the case where data specified by the logical address subsequent to that of the under-page-size data (that is, data subsequent to the under-page-size data) is later requested to be written, how the top portion of the data requested to be written (the size of the top portion is also smaller than that of a physical page) should be written is an issue.

In an existing method, it is designed that, regardless of whether or not the end of the data requested to be written matches the boundary between the physical pages, the entirety of the data requested to be written is written into a physical block subjected to processing. After that, in the case where the end of the written data does not match the boundary between the physical pages and the data subsequent to the written data is requested to be written, since there is a rule that the smallest units in which a writing operation is performed are physical pages, the under-page-size data that has already been written is combined with the under-page-size data requested to be written, which is the top portion of the data requested to be written. Then, the combined data having a size of a physical page is newly written into another physical page.

SUMMARY

In the above-described existing method, in the case where the end of the data requested to be written does not match the boundary between the physical pages, the end portion of the data, the under-page-size data, is written into the physical block subjected to processing. After that, in the case where the data that is with the pair to the under-page-size data (that is, the data specified by the same logical address as the under-page-size data) is requested to be written, data obtained by combining the data with the under-page-size data is written into another physical page, the combined data having a size of a physical page.

However, in such an existing method, garbage collection occurs a large number of times because, as described above, the data obtained by combining pieces of under-page-size data is newly written into another physical page, the combined data having a size of a physical page.

Because garbage collection occurs a large number of times, there are issues in that the processing speed decreases and the lifetime of a device performing garbage collection shortens.

The present technology is made in light of the circumstances described above. In the case where data having an end that does not match a boundary between physical regions, which are the smallest units in which a writing operation is performed, is written, it is desirable to reduce the number of times garbage collection occurs and to prevent a decrease in the processing speed and in the lifetime of a device performing garbage collection.

According to an embodiment of the present technology, there is provided a control apparatus having the following structure in the present technology.

That is, the control apparatus in the present technology includes a control unit configured to perform control in such a manner that in a case where data is to be written into a physical area, which is the unit in which an erasing operation is performed, subjected to processing in a first non-volatile memory in response to a write request and in a case where the end of the data, which is requested to be written, does not match a boundary between physical regions, which are the smallest units in which a writing operation is performed, in the first non-volatile memory, data having a size smaller than the smallest units is stored in a predetermined temporary storage area, and thereafter in a case where data specified by the same logical address as the data having a size smaller than the smallest units is requested to be written, data obtained by combining the data specified by the same logical address with the data having a size smaller than the smallest units and stored in the predetermined temporary storage area is written into the physical area subjected to processing.

Moreover, according to an embodiment of the present technology, there is provided a storage device having the following structure in the present technology.

That is, the storage device in the present technology includes a first non-volatile memory.

Moreover, the storage device in the present technology includes a control unit configured to perform control in such a manner that in a case where data is to be written into a physical area, which is the unit in which an erasing operation is performed, subjected to processing in a first non-volatile memory in response to a write request and in a case where the end of the data, which is requested to be written, does not match a boundary between physical regions, which are the smallest units in which a writing operation is performed, in the first non-volatile memory, data having a size smaller than the smallest units is stored in a predetermined temporary storage area, and thereafter in a case where data specified by the same logical address as the data having a size smaller than the smallest units is requested to be written, data obtained by combining the data specified by the same logical address with the data having a size smaller than the smallest units and stored in the predetermined temporary storage area is written into the physical area subjected to processing.

As described above, in the present technology unlike in existing methods, in the case where the data having an end that does not match the boundary between the physical regions is requested to be written and includes the data having a size smaller than the smallest units, the data having a size smaller than the smallest units is written not into the physical area subjected to processing but into the predetermined temporary storage area. Thereafter, in the case where the data specified by the same logical address as the data having a size smaller than the smallest units is requested to be written, the data obtained by combining the data specified by the same logical address with the data having a size smaller than the smallest units and stored in the predetermined temporary storage area is written into the physical area subjected to processing.

In such a present technology, unlike in existing methods, the number of times garbage collection occurs may be reduced, which is performed in existing methods due to writing of the data having a size smaller than the smallest units into the physical area subjected to processing. The number of times garbage collection occurs may be reduced, and a decrease in the processing speed and in the lifetime of a device performing garbage collection may be consequently reduced.

In the present technology, in the case where data having an end that does not match a boundary between physical regions of the non-volatile memory is written, the number of times garbage collection occurs may be reduced and a decrease in the processing speed and in the lifetime of a device performing garbage collection may be reduced.

Additional features and advantages are described herein, and will be apparent from the following Detailed Description and the figures.

BRIEF DESCRIPTION OF THE FIGURES

FIG. 6 is a diagram illustrating an example of the structure of under-page-size data management information;

DETAILED DESCRIPTION

In the following, embodiments in the present technology will be described.

First Embodiment

Figure 1:
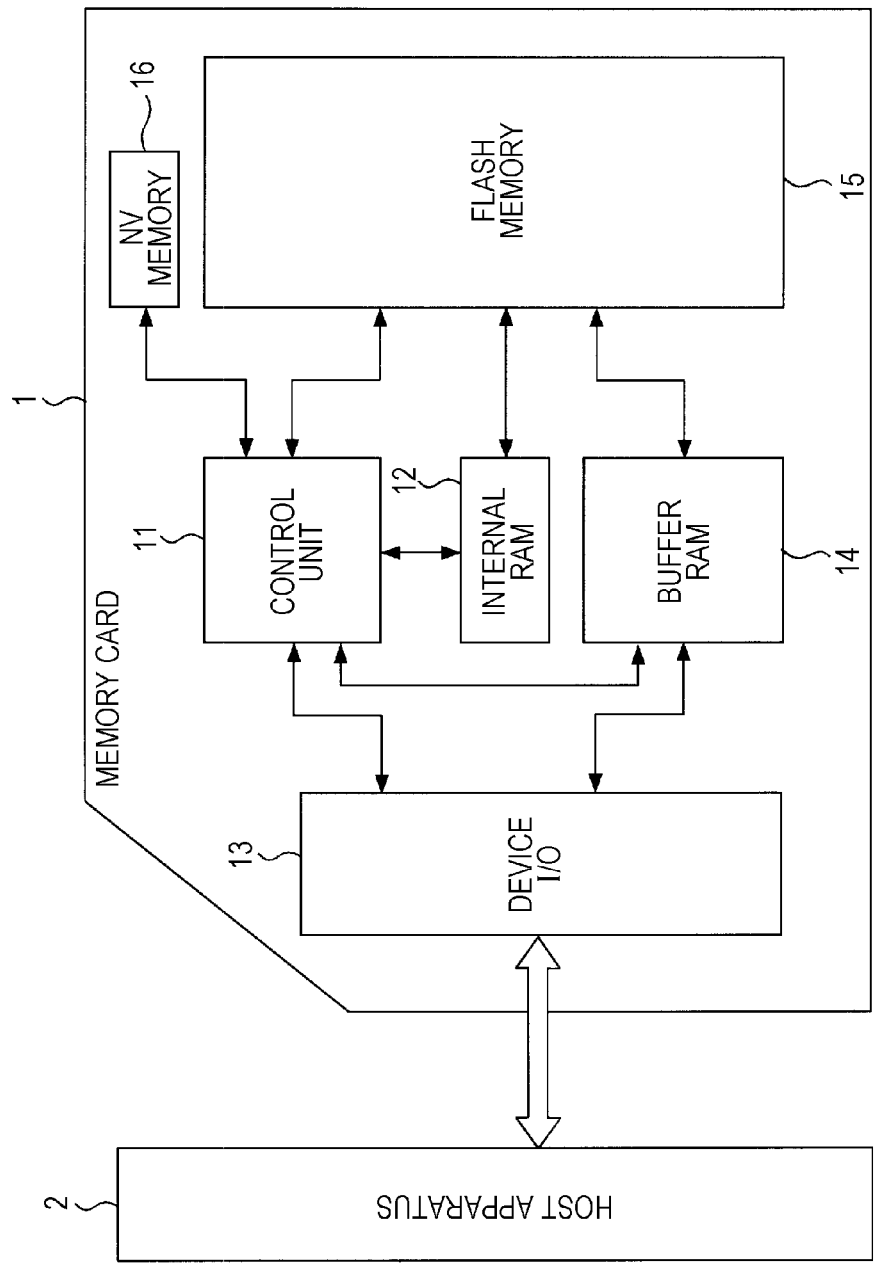
FIG. 1 is a block diagram illustrating the internal structure of a storage device according to an embodiment.

FIG. 1 is a block diagram illustrating the internal structure of a memory card 1 as an example of a memory device according to an embodiment of the present disclosure.

The memory card 1 is connected to a host apparatus 2 and used as a memory device. The host apparatus 2 may be one of various types of electronic equipment and information processing apparatuses, examples of which include information terminals such as a personal computer, a digital still camera, a video camera, an audio player, a video player, a gaming device, a portable phone, a personal digital assistant (PDA), and the like.

The memory card 1 includes a control unit 11, an internal random access memory (RAM) 12, a device interface 13, a buffer RAM 14, a flash memory 15, and a non-volatile (NV) memory 16.

The control unit 11 includes a central processing unit (CPU), and performs all control operations in the memory card 1. Thus, the control unit 11 sequentially executes instruction codes stored in the internal RAM 12. The control unit 11 mainly executes writing and reading of data in response to a command sent from the host apparatus 2. Thus, the control unit 11 controls the operation of the device interface 13 for sending and receiving data to and from the host apparatus 2, the operation of the buffer RAM 14 for writing and reading data, and the operation of accessing the flash memory 15.

The internal RAM 12 includes, for example, a static random access memory (SRAM). The internal RAM 12 is used to store programs (firmware) to be executed by the control unit 11 and is used as a work region.

The device interface 13 performs communication to and from the host apparatus 2.

The buffer RAM 14 is used to buffer transmission data (data to be written and data being read) to and from the host apparatus 2.

The flash memory 15 is a non-volatile memory. In this example, a NAND type flash memory is used.

The NV memory 16 is a non-volatile memory in which data to be used by the control unit 11 in various types of processing is stored.

As a basic operation of the memory card 1, in the case where data is to be written, a write address (logical address), data to be written, the size of the data are sent from the host apparatus 2 in addition to a write request.

The data sent from the host apparatus 2 is received by the device interface 13 and buffered by the buffer RAM 14. The data is written into the flash memory 15 under control performed by the control unit 11. The control unit 11 controls these operations in accordance with the write request, the write address, and the size of the data.

In the case where data is to be read, a read address (logical address) and the size of data are sent from the host apparatus 2 in addition to a read request. The control unit 11 reads data, which is requested, from the flash memory 15 on the basis of the read address and the size of data, and the read data is buffered by the buffer RAM 14. In addition, the control unit 11 performs error correction processing and the like on the read data, which has been buffered. Then, the read data is transferred from the buffer RAM 14 to the device interface 13 and sent to the host apparatus 2.

In the flash memory 15, physical addresses are used as addresses in a physical storage area. Physical blocks, physical pages, and physical sectors are set by using the physical addresses. A plurality of physical sectors constitute a physical page, and a plurality of physical pages constitute a physical block.

Figure 2:
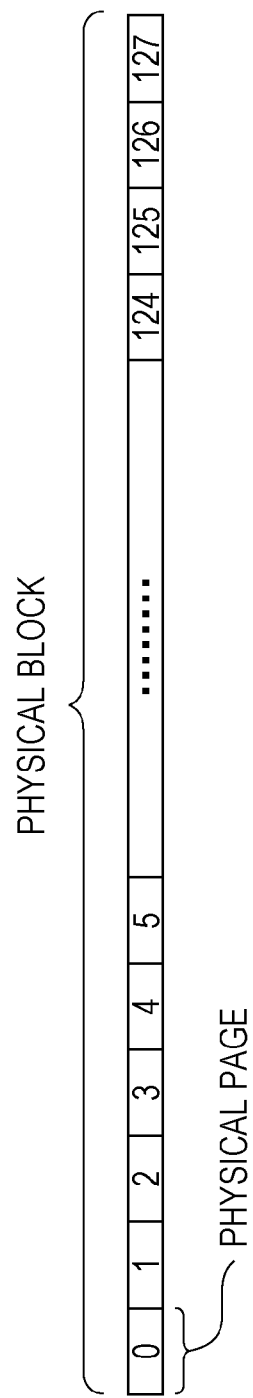
FIG. 2 is a diagram schematically illustrating a relationship between a physical block and physical pages according to an embodiment.

FIG. 2 is a schematic diagram illustrating a relationship between a physical block and physical pages.

In this embodiment, a physical block contains 128 physical pages.

Here, each physical page is divided into a plurality of physical sectors, which are not illustrated in FIG. 2.

An erasing operation (Erase) is performed per physical block. A writing operation (Program) and a reading operation (Read) may be performed per physical page. That is, physical blocks are physical areas, which are the smallest units in which an erasing operation is performed (the smallest erase units), and physical pages are physical regions, which are the smallest units in which a writing operation is performed (the smallest write units).

The host apparatus 2 uses logical addresses to specify addresses. Logical blocks, logical pages, and logical sectors specified by the logical addresses are related to the physical addresses described above. That is, the control unit 11 generates logical and physical address management information by relating the logical addresses to the physical addresses. In the case where the control unit 11 receives an access request from the host apparatus 2, the control unit 11 converts a logical address specified by the host apparatus 2 into a corresponding physical address by referring to the logical and physical address management information. The control unit 11 executes an actual operation of accessing the flash memory 15 by using the resulting physical address.

In the following, the data requested, by the host apparatus 2, to be written or read (the data managed by the host apparatus 2 by using the logical addresses) is hereinafter referred to as "host data".

Figure 3:
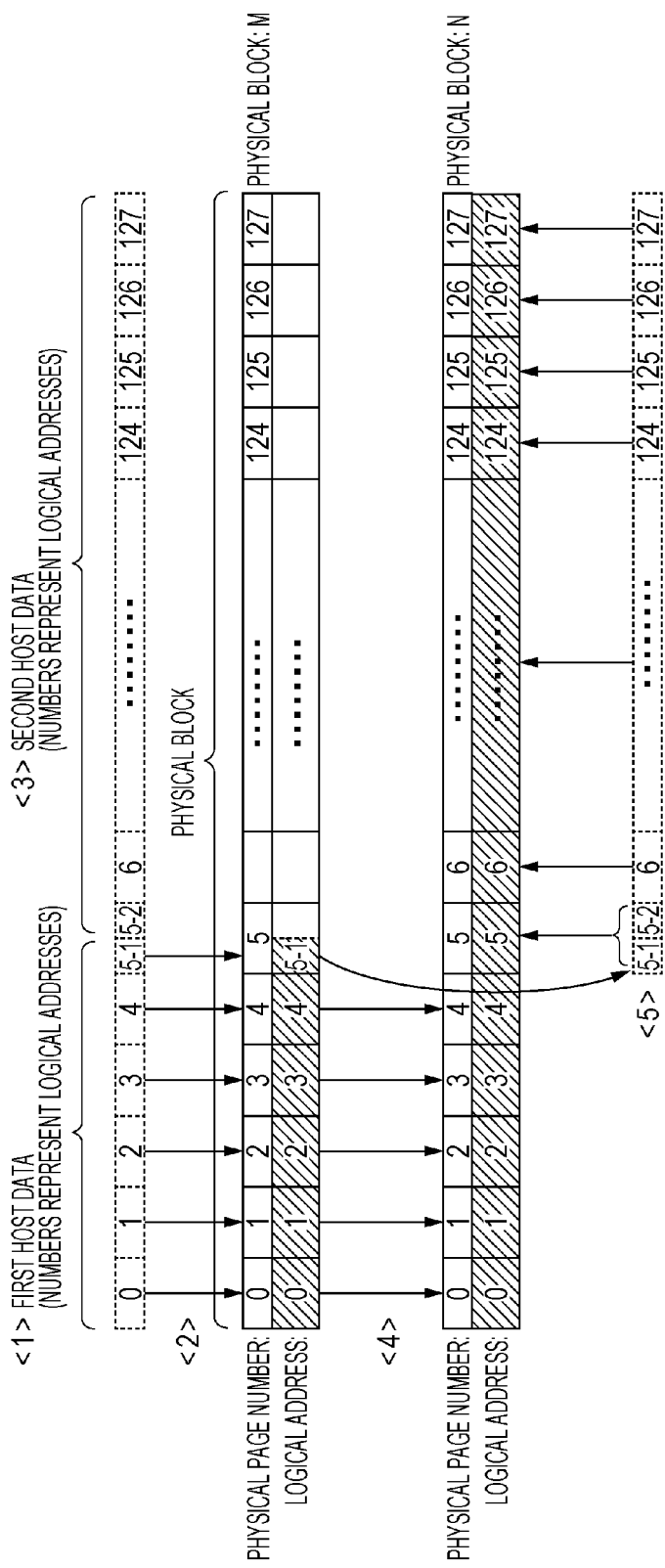
FIG. 3 is a diagram for describing an existing method in which the existence of physical pages having the same logical address is not allowed in the same physical block.

Existing general write methods includes a write method in which the existence of physical pages having the same logical address is not allowed in the same physical block as illustrated in FIG. 3.

It is assumed in FIG. 3 that nothing has yet been stored in a physical block subjected to processing, which is write processing, (referred to as a physical block M).

Moreover, it is assumed that in FIG. 3, from among host data to be written into the physical block M, which is subjected to processing, data specified by logical addresses 0, 1, 2, 3, and 4 and the first half of a logical address 5 (hereinafter referred to as a logical address 5-1) is requested to be written in the first write request and data specified by the second half of the logical address 5 (hereinafter referred to as a logical address 5-2) and logical addresses 6 to 127 is requested to be written in the second write request. That is, it is assumed that data having an end that does not match a boundary between physical pages is requested to be written in the first write request and the subsequent data (the data specified by the subsequent logical address) is requested to be written in the second write request.

In this case in response to the first write request for writing the host data, the host data requested to be written (the logical addresses 0 to 5-1) as denoted by <1>in FIG. 3 is written into the physical block M sequentially from the first physical page (a physical page with physical page number 0) as denoted by <2>in FIG. 3.

That is, in physical blocks, physical pages are sequentially used from the first physical page (the physical page with physical page number 0).

As a result of such write processing, data having a size smaller than a physical page (such data being hereinafter referred to as under-page-size data), is stored in the last used physical page of the physical block M.

Here, the above-described "last used physical page" is a physical page into which the latest data write processing as of this point in time is performed with the condition that the physical pages of a physical block are sequentially used from the physical page with physical page number 0, as described above.

It is assumed that after the processing denoted by <2>in FIG. 3 is performed, the second write request for writing the host data is issued as denoted by <3>in FIG. 3.

Data specified by the logical address 5-2 is the top portion of the data requested to be written in the second write request. Since the smallest units in which a writing operation is performed are physical pages, it is not possible to write the data specified by the logical address 5-2 into a physical page with physical page number 5, in which the under-page-size data specified by the logical address 5-1 is stored.

Furthermore, in the case of FIG. 3, the existence of physical pages having the same logical address is not allowed in the same physical block. Thus, it is also not possible to write the data specified by the logical address 5-2 into the physical block M.

Then, in this case, the data specified by the logical addresses 0 to 4 and stored in the physical block M (that is, the host data except for the under-page-size data) in response to the first write request is first written into a physical block N sequentially from the first physical page as denoted by <4>in FIG. 3, which is newly prepared, in response to the second write request denoted by <3>in FIG. 3.

Then, as denoted by <5>in FIG. 3, the data specified by the logical address 5-1, which is the under-page-size data obtained as a result of the processing performed in response to the first write request, is read, temporarily stored, and combined with the top portion of the data requested to be written in the second write request. The combined data is written into the subsequent physical page of the physical block N.

As a result, the under-page-size data may be properly processed while the condition that the existence of physical pages having the same logical address is not allowed in the same physical block is satisfied.

However, in the existing method illustrated in FIG. 3, every time when the under-page-size data is processed, it is necessary to copy the under-page-size data into the physical block N, which is newly prepared. That is, garbage collection occurs.

As described above, in the existing method illustrated in FIG. 3, garbage collection occurs a large number of times. As a result, the processing speed may decrease and the lifetime of a device performing garbage collection may shorten.

Figure 4:
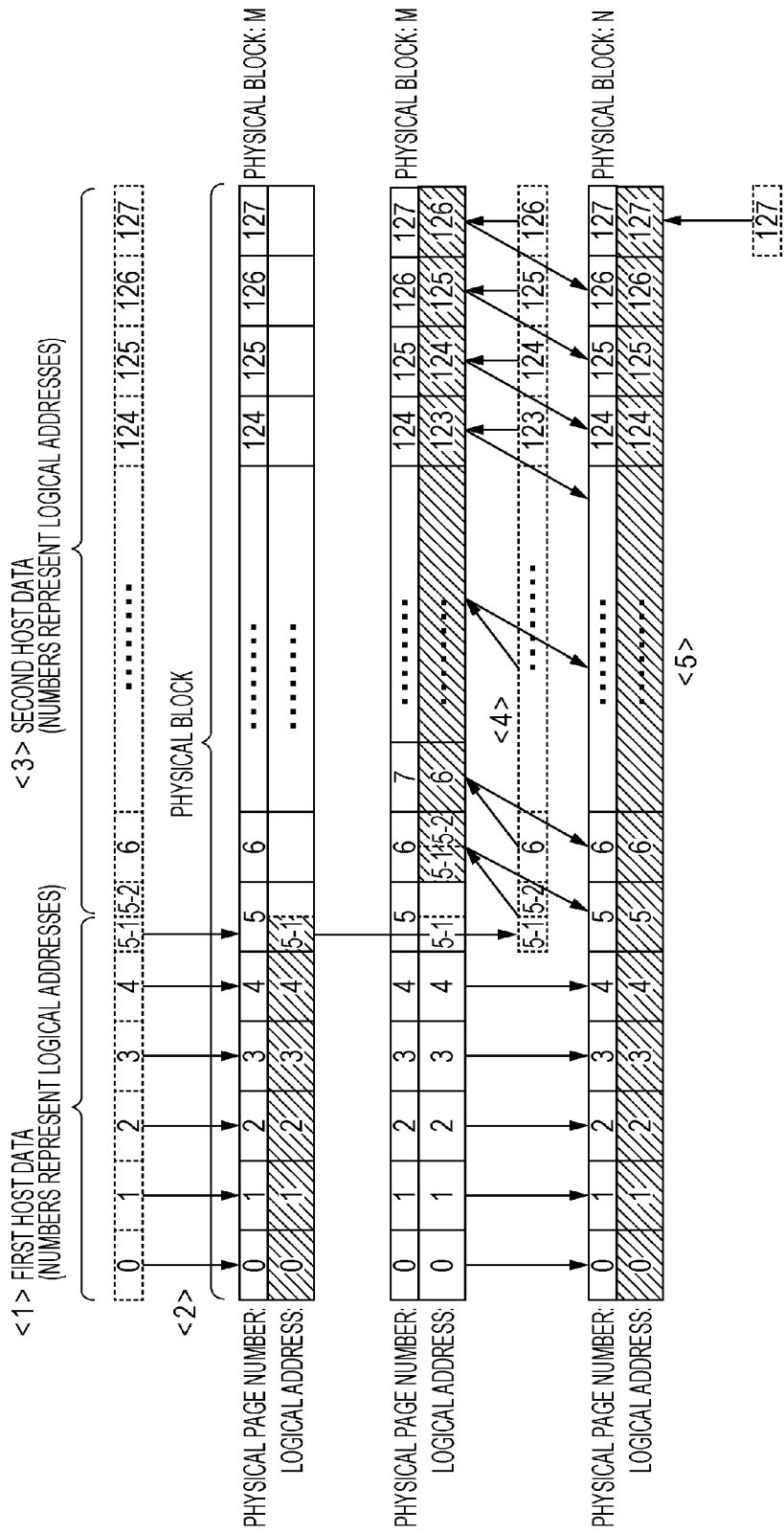
FIG. 4 is a diagram for describing an existing method in which the existence of physical pages having the same logical address is allowed in the same physical block.

FIG. 4 illustrates a write method as another existing method in the case where the existence of physical pages having the same logical address is allowed in the same physical block.

It is also assumed in FIG. 4 that nothing has yet been stored in the physical block M subjected to processing, which is write processing, and that the data specified by the logical addresses 0 to 5-1 is requested to be written in the first write request and the data specified by the logical addresses 5-2 to 127 is requested to be written in the second write request.

In this case also, in response to the first write request for writing the host data denoted by <1>in FIG. 4, the host data requested to be written (the logical addresses 0 to 5-1) is written into the physical block M sequentially from the first physical page thereof as denoted by <2>in FIG. 4. That is, in this case also, the under-page-size data (the logical address 5-1) is stored in the last used physical page as of this point in time in the physical block M.

Next, the second write request denoted by <3>in FIG. 4 is issued. Since the existence of physical pages having the same logical address is allowed in the same physical block in the method illustrated in FIG. 4, it is possible to write the under-page-size data (the logical address 5-2) into the physical block M. Here, the logical address 5-2 is the top portion of the data requested to be written in the second write request.

Then, in this case, as denoted by <4>in FIG. 4, the under-page-size data (the logical address 5-1), which is the under-page-size data stored in the physical page with physical page number 5 and resulted from the processing performed in response to the first write request, is first read in response to the second write request denoted by <3>in FIG. 4. The read under-page-size data is combined with the data requested to be written in the second write request. The combined data is written into the subsequent physical page, which is subsequent to the last used physical page as of this point in time, in the physical block M.

Note that, in the second write request in this case, the host data up to the logical address 127 is requested to be written. Furthermore, since the units in which an erasing operation is performed are physical blocks, it is not possible to overwrite the under-page-size data stored in the physical page with physical page number 5, the under-page-size data resulted from the processing performed in response to the first write request.

Therefore, in the case where the host data denoted by <4>in FIG. 4 is written into the physical block M, it is not possible to write the data (the logical address 127) that is to be written into the last physical page in the physical block M, from among the data requested to be written in the second write request.

Thus, as denoted by <5>in FIG. 4, it is necessary to prepare another new physical block, which is the physical block N, in addition to the physical block M. The data specified by the logical addresses 0 to 4 stored in physical pages with physical page numbers 0 to 4 in the physical block M and the data specified by the logical addresses 5 to 126 stored in physical pages with physical page numbers 6 to 127 in the physical block M are read. Then, the read data specified by the logical addresses 0 to 126 is written into the physical block N sequentially from the first physical page thereof, and the data specified by the logical address 127 is written into the last physical page (physical page number 127) in the physical block N.

As a result, the data specified by the subsequent logical addresses may be stored in one physical block.

According to the existing method illustrated in FIG. 4 unlike in the existing method illustrated in FIG. 3, the existence of physical pages having the same logical address is allowed in the same physical block. Thus, garbage collection does not occur every time the under-page-size data is processed; however, before writing of the data having a size of a physical block and specified by the subsequent logical addresses is finished, it is necessary to copy, at least once, the data stored in a physical block into another physical block. That is, garbage collection occurs.

Thus, even in the existing method illustrated in FIG. 4, garbage collection occurs a relatively large number of times in the processing. As a result, with respect to the existing method illustrated in FIG. 4, there are issues in that the processing speed may decrease and the lifetime of a device performing garbage collection may shorten.

The first embodiment is made in light of the circumstances described above. In the case where data having an end that does not match a boundary between physical regions, which are the smallest units in which a writing operation is performed, it is desirable to reduce the number of times garbage collection occurs and to prevent a decrease in the processing speed and in the lifetime of a device.

Figure 5:
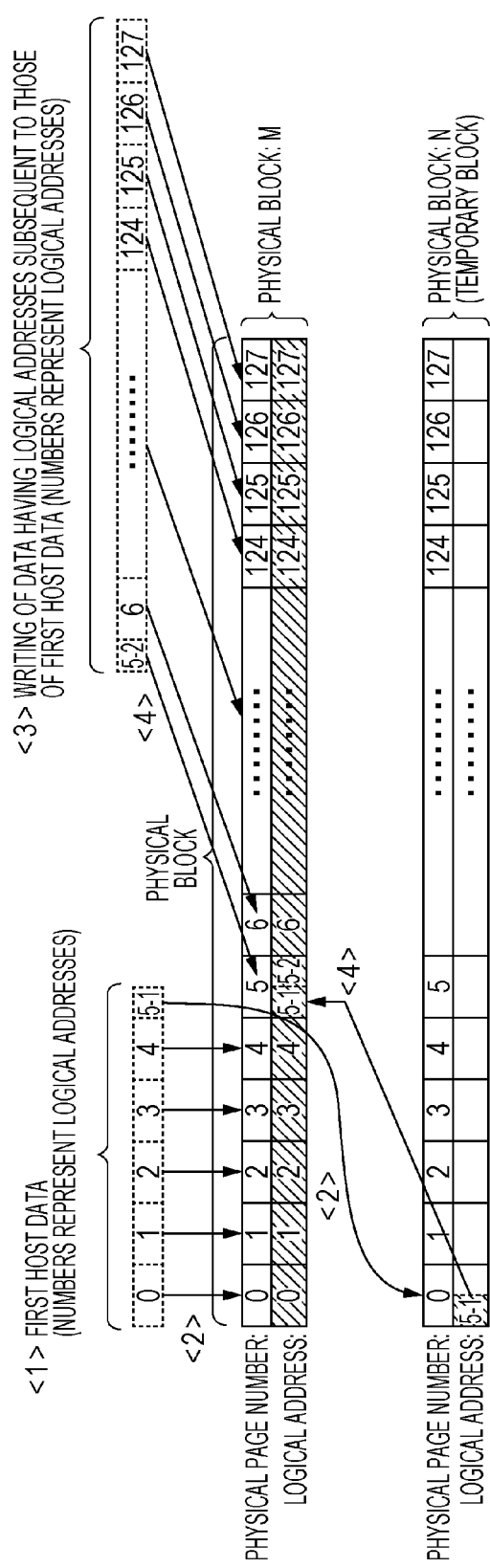
FIG. 5 is a diagram for describing a write method as a first embodiment.

FIG. 5 is a diagram for describing a write method as the first embodiment.

In the first embodiment unlike in the existing methods, in the case where data having an end that does not match a boundary between physical pages is requested to be written and includes under-page-size data, the under-page-size data is not written into the physical block subjected to processing. The under-page-size data is temporarily stored in a predetermined temporary storage area. After that, in the case where data specified by the same logical address (the same page address) as the above-described under-page-size data is requested to be written, the data specified by the same logical address is combined with the under-page-size data stored in the predetermined temporary storage area, and the combined data is written into the physical block subjected to processing.

In the following, the write method according to the first embodiment will be described using examples.

In FIG. 5, it is assumed that the host data specified by the logical addresses 0 to 5-1 as denoted by <1>in FIG. 5 is requested to be written in the first write request.

Here, in this case also, it is assumed that nothing has yet been stored in the physical block M subjected to processing.

In the first embodiment, as denoted by <2>in FIG. 5, the data except for the data specified by the logical address 5-1, which is the under-page-size data, from among the data specified by the logical addresses 0 to 5-1 is written into the physical block M sequentially from the physical page with physical page number 0 in response to the first write request denoted by <1>in FIG. 5.

Then, the data specified by the logical address 5-1, which is under-page-size data, is written into the physical block N prepared in the flash memory 15.

Here, the physical block N is a physical block prepared by the control unit 11 in order to temporarily store such under-page-size data. In the following, such a physical block is also referred to as a "temporary block".

Then, it is assumed that after the first write request denoted by <1>in FIG. 5 is issued, as denoted by <3>in FIG. 5, host data specified by logical addresses subsequent to those of the host data requested in the first write request is requested to be written. As illustrated in FIG. 5, the host data denoted by <3>is the data specified by the logical addresses 5-2 to 127.

In response to the write request denoted by <3>in FIG. 5, as denoted by <4>in FIG. 5, the under-page-size data (the logical address 5-1) stored in the physical block N serving as a temporary block is first read and then the read under-page-size data is combined with the under-page-size data (the logical address 5-2) located in the host data denoted by <3>in FIG. 5. The combined data is written into the physical page with physical page number 5, which is the physical page subsequent to the last used physical page as of this point in time. Then, the rest of the host data (the logical addresses 6 to 127) denoted by <3>in FIG. 5 is written into the subsequent physical pages with physical page numbers 6 to 127 in the physical block M in a sequential manner.

Here, the following is stated again for making a confirmation. The reason why data is written from the physical page subsequent to the last used physical page as described above is that the physical pages in a physical block are supposed to be used sequentially from the physical page with physical page number 0.

As described above, in the first embodiment, in the case where the data having an end that does not match the boundary between the physical pages is requested to be written and includes under-page-size data, the under-page-size data is written into the temporary block prepared in the flash memory 15. After that, in the case where the data specified by the same logical address as the under-page-size data is requested to be written, the data specified by the same logical address is combined with the under-page-size data temporarily stored in the predetermined temporary storage area, and the combined data is written into the physical block subjected to processing.

In the first embodiment unlike in the existing methods, the under-page-size data is not written into the physical block subjected to processing. Thus, the number of times garbage collection occurs may be decreased compared to the existing methods. Thus, a decrease in the processing speed and in the lifetime of a device performing garbage collection may be reduced.

Here, in the case where the data having an end that does not match the boundary between the physical pages is requested to be written and includes under-page-size data and, after that, the data that is the pair to the under-page-size data (that is, the data specified by the same logical address as the under-page-size data) is requested to be written, the temporary block is searched for the under-page-size data discussed here in the write method according to the first embodiment. In order to accelerate the speed of this search in this case, under-page-size data management information for managing a storage state of under-page-size data in the temporary block is generated in the first embodiment.

FIG. 6 illustrates an example of the structure of the under-page-size data management information.

As illustrated in FIG. 6, the under-page-size data management information is information in which the logical addresses and the physical page numbers are related to each other. More specifically, the under-page-size data management information is information in which the logical address of the under-page-size data stored in the temporary block is related to information on the physical page number in the temporary block where the under-page-size data is stored.

The control unit 11 generates such under-page-size data management information, and stores the under-page-size data management information in a predetermined memory, for example, in the NV memory 16 or the flash memory 15.

In the case where the control unit 11 identifies the location of the under-page-size data specified by a subject logical address in the temporary block (whether the under-page-size data exists or not and where the under-page-size data is stored), the control unit 11 refers to the under-page-size data management information. If such under-page-size data management information is not used, it is necessary to sequentially read pieces of under-page-size data stored in the temporary block and obtain information on the logical address of each of the pieces of under-page-size data. However, according to the first embodiment in which the location of the under-page-size data, which is subject data, is identified in accordance with the under-page-size data management information, it is not necessary to sequentially read the pieces of under-page-size data stored in the temporary block. As a result, a processing time necessary for searching for the under-page-size data, which is subject data, may be shortened.

Figure 7:
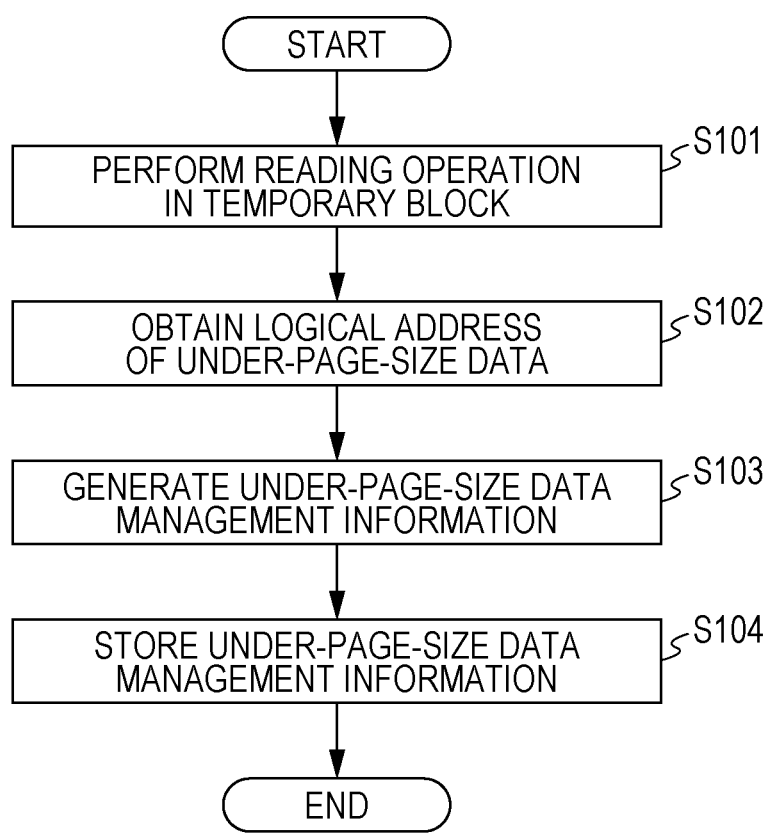
FIG. 7 is a flowchart illustrating the procedure of generating the under-page-size data management information.

FIG. 7 is a flowchart illustrating processing for generating the under-page-size data management information described above.

Figure 8:
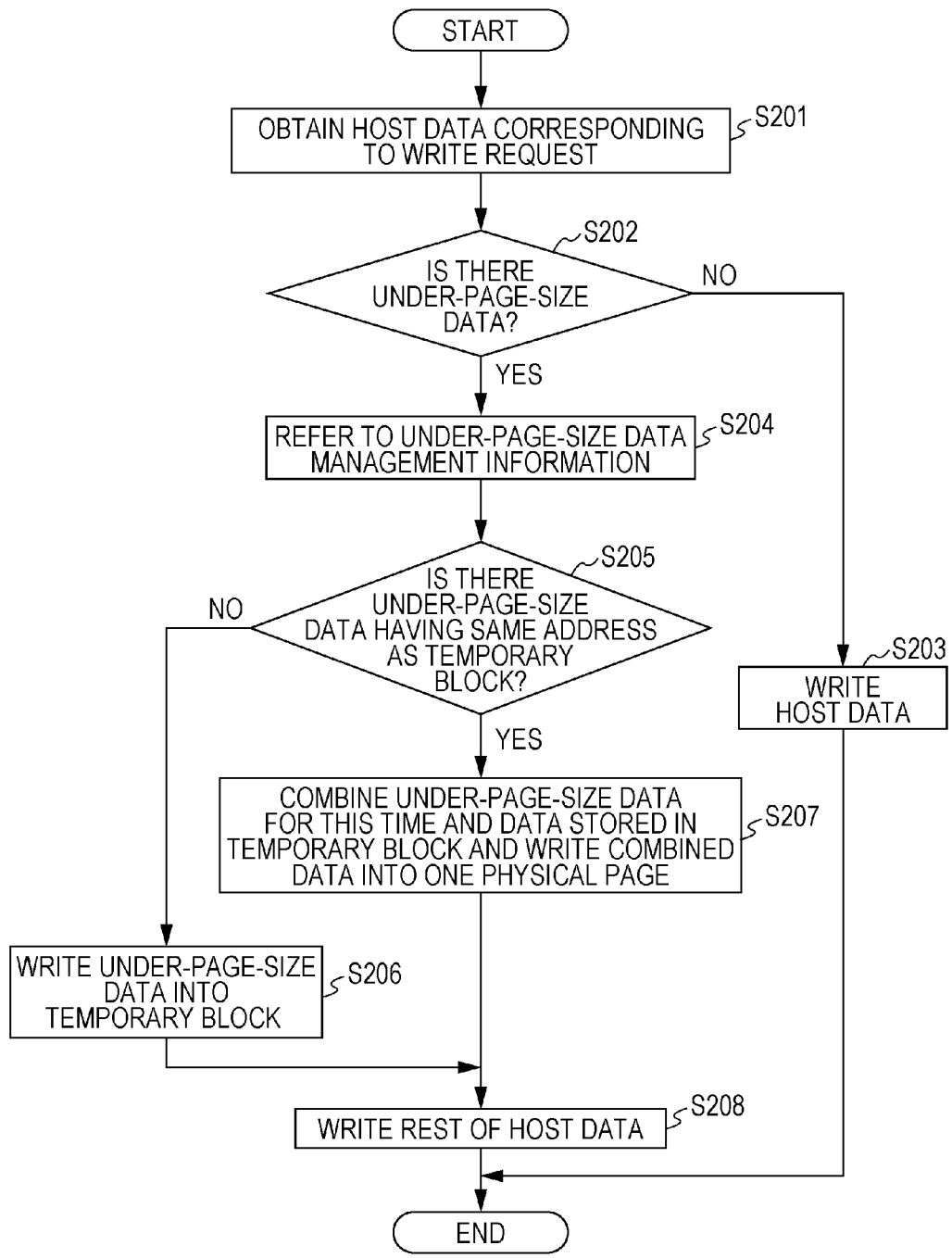
FIG. 8 is a flowchart illustrating processing performed when data is written in the first embodiment.

Here, the control unit 11 executes the processing illustrated in FIG. 7 and subsequent processing illustrated in FIG. 8 in accordance with programs stored in a predetermined memory, for example, in the flash memory 15 or the NV memory 16.

In FIG. 7, the control unit 11 first performs a reading operation in the temporary block in step S101 and obtains the logical address of under-page-size data, which is under-page-size data stored in the temporary block, in step S102. Thereafter, in step S103, the control unit 11 generates the under-page-size data management information on the basis of information on the obtained logical address. That is, the under-page-size data management information is generated by relating the information on the logical address of the under-page-size data obtained in step S102 to information on the physical page number, in the temporary block, at which the under-page-size data is stored.

The control unit 11 stores the under-page-size data management information generated as described above in a predetermined memory in step S104. As described above, examples of the memory in which the under-page-size data management information is stored are desirably the NV memory 16, the flash memory 15, and the like.

Here, in order to accelerate the speed of search, it is desirable to execute the processing for generating the under-page-size data management information illustrated in FIG. 7 every time under-page-size data is written into the temporary block.

Alternatively, a method may also be used in which the processing for generating the under-page-size data management information is executed at least when the control unit 11 is started.

Alternatively, a method may also be used in which the processing for generating the under-page-size data management information is executed every n times under-page-size data is written into the temporary block (n is a natural number greater than or equal to two).

In the case where the processing for generating the under-page-size data management information is executed every time under-page-size data is written into the temporary block, it is not necessary to perform the processing illustrated in FIG. 7 on every occasion, as the processing for generating the under-page-size data management information. In the case where the processing illustrated in FIG. 7 is executed every time under-page-size data is written into the temporary block, it is necessary to reconstruct the relationships between the logical addresses and the physical addresses of all under-page-size data stored in the temporary block every time such write processing is performed. The processing illustrated in FIG. 7 may be considered inefficient in this point. Thus, in the case where the processing illustrated in FIG. 7 is executed every time under-page-size data is written into the temporary block, a method may be used in which the relationship between the logical address and the physical address of under-page-size data newly written into the temporary block is added to the existing under-page-size data management information.

Here, in the case where processing for constructing the relationships between the logical addresses and the physical addresses of all under-page-size data stored in the temporary block as illustrated in FIG. 7 is used, the reliability of the under-page-size data management information against, for example, data corruption may be improved.

FIG. 8 illustrates processing to be executed when host data is written.

In FIG. 8, in step S201, the control unit 11 obtains host data, which is to be written, the logical addresses thereof, and the like in response to a write request for writing the host data, the write request being sent from the host apparatus 2.

Specifically, the control unit 11 temporarily stores the host data sent from the host apparatus 2 in the buffer RAM 14 via the device interface 13. Moreover, the control unit 11 obtains the logical addresses of the host data to be written and the amount of data thereof from a write request received via the device interface 13.

Thereafter, in step S202, the control unit 11 determines whether there is under-page-size data or not. That is, it is determined whether the host data includes under-page-size data on the basis of information on the amount of data of the host data obtained in step S201 (that is, whether the end of the host data requested to be written this time does not match a boundary between physical pages).

If it is determined in step S202 that the end of the host data requested to be written this time matches the boundary between the physical pages and a negative result indicating that the host data has no under-page-size data is obtained, the procedure proceeds to step S203. In step S203, the control unit 11 writes the host data. That is, in this case, the control unit 11 writes the host data into the physical block subjected to processing, sequentially from the physical page subsequent to the last used physical page.

On the other hand, if it is determined in step S202 that the end of the host data requested to be written this time does not match the boundary between the physical pages and a positive result indicating that the host data includes under-page-size data is obtained, the procedure proceeds to step S204. In step S204, the control unit 11 refers to the under-page-size data management information. In step S205, the control unit 11 determines whether under-page-size data specified by a matching logical address is stored in the temporary block. That is, the control unit 11 determines whether the under-page-size data specified by the same logical address (a logical page address) as the under-page-size data detected in step 5202 is stored in the temporary block.

In step S205, if a negative result indicating that no under-page-size data specified by the matching address is stored in the temporary block is obtained, the procedure proceeds to step S206. In step S206, the control unit 11 writes the under-page-size data detected in step S202 into the temporary block. Then, in step S208, the control unit 11 writes the rest of the host data. As understood by the description above, the rest of the host data is written into physical pages in the physical block subjected to processing, from the physical page subsequent to the last used physical page.

On the other hand, in step S205, if a positive result indicating that the under-page-size data specified by the matching address is stored in the temporary block is obtained, the procedure proceeds to step S207. In step S207, the control unit 11 combines the under-page-size data stored in the temporary block with the under-page-size data for this time (the under-page-size data detected in step S202) and writes the combined data into one physical page. Then, in step S208, the control unit 11 writes the rest of the host data.

Unlike in the existing methods, the number of times garbage collection occurs may be reduced by performing the processing illustrated in FIG. 8. As a result, a decrease in the processing speed and in the lifetime of a device performing garbage collection may be reduced.

Second Embodiment

Next, a second embodiment will be described.

In the second embodiment, the under-page-size data is not written into the temporary block in the flash memory 15 but in a predetermined memory outside the flash memory 15.

Specifically, the under-page-size data is written into the NV memory 16 in this example.

Figure 9:
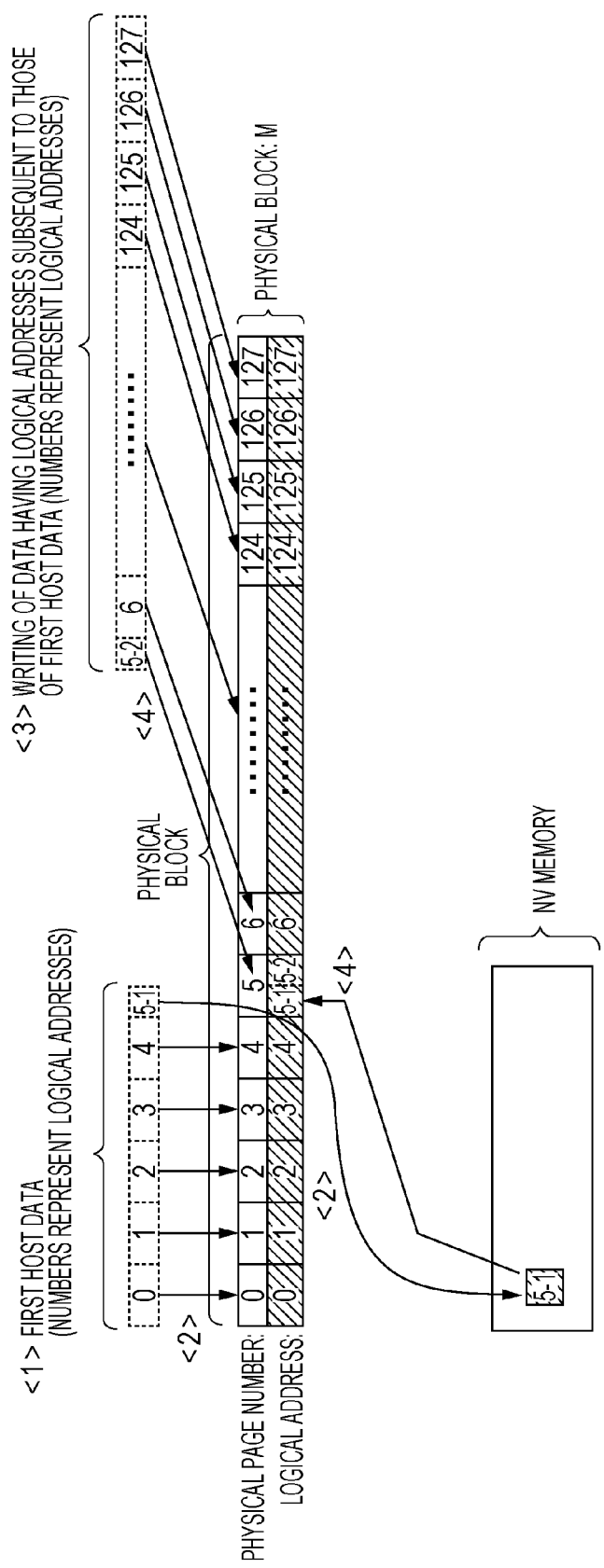
FIG. 9 is a diagram for describing a write method as a second embodiment.

FIG. 9 illustrates a write method according to the second embodiment.

FIG. 9 illustrates, as an example, a case in which host data is requested to be written similarly to the above-described case illustrated in FIG. 5. As is clear from the comparison between FIGS. 9 and 5, the second embodiment differs from the first embodiment in that the under-page-size data is stored in the NV memory 16, the under-page-size data being included in the data that is requested to be written in a write request and that has an end that does not match the boundary between the physical pages.

Here, the following is stated again for making a confirmation. Information for managing under-page-size data stored in the NV memory 16 is generated as the under-page-size data management information in this case. Specifically, the control unit 11 in this case generates, as the under-page-size data management information, information by relating the logical address of each under-page-size data stored in the NV memory 16 to the physical address in the NV memory 16 where the under-page-size data is stored.

Moreover, when write processing is performed in this case, the procedure similar to that illustrated in FIG. 8 is performed in which the phrase "temporary block" in steps S205, S206, and S207 is replaced with "NV memory 16".

According to the second embodiment, it may be prevented that a large part of the storage capacity of the flash memory 15, that is, the storage capacity for user data, is used to temporarily store under-page-size data.

MODIFIED EXAMPLE

The embodiments according to the present disclosure have been described above; however, the present disclosure should not be limited to the examples described above.

For example, the memory card 1 is used in the examples; however, the present disclosure may also be applicable to a case where the flash memory 15 and the control unit 11 are separately mounted.

Here, the present disclosure may be applicable to various memory cards, SSDs, eMMCs, and the like.

Moreover, the case where the present disclosure is applied to the storage device having a NAND type flash memory has been described in the above as an example; however, the present disclosure may be preferably applied to a case where data is written into a NV memory in which physical blocks, which are the units in which an erasing operation is performed, are larger than physical pages, which are the smallest units in which a writing operation is performed, in size. The type of NV memory to be used should not be limited to a NAND type flash memory.

Moreover, the present disclosure may have the following structures.

(1) A control apparatus including a control unit configured to perform control in such a manner that in a case where data is to be written into a physical area, which is the unit in which an erasing operation is performed, subjected to processing in a first non-volatile memory in response to a write request and in a case where the end of the data, which is requested to be written, does not match a boundary between physical regions, which are the smallest units in which a writing operation is performed, in the first non-volatile memory, data having a size smaller than the smallest units is stored in a predetermined temporary storage area, and thereafter in a case where data specified by the same logical address as the data having a size smaller than the smallest units is requested to be written, data obtained by combining the data specified by the same logical address with the data having a size smaller than the smallest units and stored in the predetermined temporary storage area is written into the physical area subjected to processing.

(2) In the control apparatus according to (1), the control unit generates data management information for managing a storage state of the data having a size smaller than the smallest units and stored in the predetermined temporary storage area, on the basis of information on a logical address of the data having a size smaller than the smallest units.

(3) In the control apparatus according to (1) or (2), a physical area in the first non-volatile memory is set as the predetermined temporary storage area, and the control unit stores the data having a size smaller than the smallest units in the physical area.

(4) In the control apparatus according to (1) or (2), a second non-volatile memory outside the first non-volatile memory is set as the predetermined temporary storage area, and the control unit stores the data having a size smaller than the smallest units in the second non-volatile memory.

(5) In the control apparatus according to any of (1) to (4), the control unit performs writing control on the first non-volatile memory, which is a NAND type flash memory.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A control apparatus comprising:
a control unit configured to:
perform control in such a manner that
in a case where first data is to be written into a first non-volatile memory in response to a write request, and
in a case where the end of the first data does not match a boundary between physical regions, wherein the physical regions are smallest units in which a writing operation is performed in the first non-volatile memory,
a portion of the first data having a size smaller than the smallest units is stored in a predetermined temporary storage area, and thereafter in a case where a portion of second data having a size smaller than the smallest units and specified by the same logical address as the portion of the first data is requested to be written along with remaining portion of the second data, a third data obtained by combining the portion of the second data with the portion of the first data is written into a first physical region corresponding to the specified logical address, and
generate data management information that stores relationship between information on the logical address of the portion of the first data and information on a physical page number of the predetermined temporary storage area at which the portion of the first data is stored.

2. The control apparatus according to claim 1, wherein the control unit is configured to generate the data management information for managing a storage state of the portion of the first data based on the information on the logical address of the portion of the first data.

3. The control apparatus according to claim 1,
wherein a second physical region in the first non-volatile memory is set as the predetermined temporary storage area, and
wherein the control unit is configured to store the portion of the first data in the second physical region.

4. The control apparatus according to claim 1,
wherein a second non-volatile memory outside the first non-volatile memory is set as the predetermined temporary storage area, and
wherein the control unit is configured to store the portion of the first data in the second non-volatile memory.

5. The control apparatus according to claim 1, wherein the control unit is configured to perform writing control on the first non-volatile memory, which is a NAND type flash memory.

6. The control apparatus according to claim 1, wherein the control unit is configured to add the relationship, in the data management information, each time the portion of the first data is written into the predetermined temporary storage area.

7. The control apparatus according to claim 1, wherein the control unit is configured to identify the logical address of the portion of the first data in accordance with the data management information.

8. A storage device comprising:
a first non-volatile memory; and
a control unit configured to:
perform control in such a manner that
in a case where first data is to be written into the first non-volatile memory in response to a write request, and
in a case where the end of the first data does not match a boundary between physical regions, wherein the physical regions are smallest units in which a writing operation is performed in the first non-volatile memory,
a portion of the first data having a size smaller than the smallest units is stored in a predetermined temporary storage area, and thereafter in a case where a portion of second data having a size smaller than the smallest units and specified by the same logical address as the portion of the first data is requested to be written along with remaining portion of the second data, a third data obtained by combining the portion of the second data with the portion of the first data is written into a first physical region corresponding to the specified logical address, and generate data management information that stores relationship between information on the logical address of the portion of the first data and information on a physical page number of the predetermined temporary storage area at which the portion of the first data is stored.

9. A storage control method comprising:

performing control in such a manner that in a case where first data is to be written into a first non-volatile memory in response to a write request, and in a case where the end of the first data does not match a boundary between physical regions, wherein the physical regions are smallest units in which a writing operation is performed in the first non-volatile memory, a portion of the first data having a size smaller than the smallest units is stored in a predetermined temporary storage area, and thereafter in a case where a portion of second data having a size smaller than the smallest units and specified by the same logical address as the portion of the first data is requested to be written along with remaining portion of the second data, a third data obtained by combining the portion of the second data with the portion of the first data is written into a first physical region corresponding to the specified logical address, and generating data management information that stores relationship between information on the logical address of the portion of the first data and information on a physical page number of the predetermined temporary storage area at which the portion of the first data is stored.

* * * * *